March 12, 1963 J. P. WOODS ETAL 3,080,642

METHOD OF MANUFACTURING MAGNETIC RECORDING HEADS

Filed Feb. 6, 1956 5 Sheets-Sheet 1

Attest:
Charles F. Steininger

INVENTORS
John. P. Woods.
HENRY R BARTA
BY Norbert E. Birch
Attorney

March 12, 1963 J. P. WOODS ETAL 3,080,642

METHOD OF MANUFACTURING MAGNETIC RECORDING HEADS

Filed Feb. 6, 1956 5 Sheets-Sheet 2

INVENTORS

Attest:
Charles F. Steininger

John P. Woods
BY HENRY R BARTA
Norbert E. Birch
Attorney

METHOD OF MANUFACTURING MAGNETIC RECORDING HEADS

INVENTORS
John P Woods
HENRY R BARTA
BY Norbert C. Birch
Attorney

Attest
Charles F. Steininger

INVENTORS
John P Woods
HENRY R. BARTA
BY Norbert E. Birch
Attorney

Attest
Charles F. Steininger

INVENTORS
John P Woods
HENRY R. BARTA
BY Norbert E. Birch
Attorney

Attest
Charles F. Steininger

1

3,080,642

METHOD OF MANUFACTURING MAGNETIC RECORDING HEADS

John P. Woods and Henry Robert Barta, both of 3629 Cragmont, Dallas, Tex.

Filed Feb. 6, 1956, Ser. No. 563,463
2 Claims. (Cl. 29—155.57)

Figure 1:
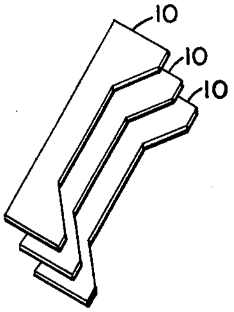

The present invention relates to a novel magnetic recording and reproducing head and the method of manufacturing the same. In another aspect the present invention relates to novel multi-channel, magnetic recording and reproducing apparatus including said novel recording and reproducing head.

Present day uses of electromagnetic recording and reproducing apparatus, such as, recently developed memory devices and seismic exploration equipment, make it highly desirable to produce magnetic recording heads which are economical, small in size, sufficiently rugged to withstand physical shocks, and readily replaceable in the event of failure. Since the total amount of information to be recorded and retained in the use of such equipment is very large, it is imperative that a large number of individual recording heads be employed simultaneously and that a maximum amount of information be accommodated within a minimum of recording surface. Therefore, a major problem to the equipment manufacturer or user is the production of multi-channel or multiple head recording assemblies which will meet the previously mentioned requirements.

In present day methods of manufacturing magnetic recording heads the first step of the operation is to provide suitable pole pieces wound with a predetermined number of turns of an electrically conductive wire. Each pole piece is generally formed by cementing together thin sheets of transformer steel, hydrogen annealed molybdenum permalloy, or the like to form a laminated pole piece. In order to insulate the pole piece from the electrical winding it is then necessary to provide a suitable non-conductive winding base on the pole piece. Since the pole pieces employed in the formation of magnetic recording heads are generally C-shaped in structure even this simple operation of forming a winding base is unduly complicated and wrought with difficulties. In some cases the winding bases are formed by wrapping insulating tape about the mid-portion of the pole piece. However, this type of winding base obviously has no means of holding the winding on the insulated portion and therefore extreme care must be exercised in the winding operation to prevent running off the insulation and once the pole piece is wound the winding must be covered with a heavy coating of a binding cement to prevent the winding from being displaced and contacting the uninsulated portion of the pole piece. In some few other cases a preformed winding base of a non-conductive resin, generally provided with flanges at either end to hold the winding within the limits of the base, is provided. Inasmuch as the pole pieces are C-shaped, this preformed base must be made in two sections which are then cemented together about the mid-portion of the pole piece. Obviously, this method of providing a winding base requires an undue multiplicity of operations which form a major portion of the cost of manufacture of the head.

Once the electrical windings have been placed on the individual pole pieces two such pole pieces are then assembled in face to face relationship to each other with a predetermined gap between the confronting tips of the pole pieces to form a complete recording head. This step in the manufacture of the recording head is generally performed by placing a thin, non-magnetic spacer between the confronting tips of the pole pieces and clamping the pole pieces between two preformed blocks of non-conductive material, as by placing the blocks of non-conductive material on the top and bottom of the pole pieces and running a bolt vertically through the entire assembly. It is obvious that the problems of aligning the two pole pieces and accurately adjusting the gap are quite troublesome in this type of construction. In addition, recording heads constructed in this manner are not sufficiently rugged for certain uses and the heads are too bulky for use in apparatus requiring a large number of heads.

2

More recently it has been proposed that a compact multiple head construction may be made by forming two separate, symmetrical half sections, each half representing the mirror image of its companion half. Each such half head contains the required number of individual wound pole pieces spaced a predetermined distance from one another. The individual pole pieces are cast in a thermosetting resin to form the half sections mentioned above. The exposed tips of the two half sections are then machined so that the pole tips lie in a common plane. The two half sections are then aligned in face to face relationship to one another and a non-magnetic spacer is placed between the confronting tips of the pole pieces. Finally, the two halves are joined by a second casting operation to form a unitary block. There are, however, a number of problems involved in this method of manufacturing a multi-channel head assembly. Since the heads are formed as half sections it is impossible to internally connect the windings of each head in series, which is done in many cases, and thus a large number of exposed lead wires are present which must be joined after the half sections are combined. Also, in such construction there is a possibility that the individual pole pieces are not exactly spaced and when the two halves are aligned the two pole pieces of an individual head may not be in exact alignment. This situation cannot be remedied since all the pole pieces are permanently set in the half sections and no adjustment can be made once the casting of the half section is completed. Due to the large number of individual pole tips and the fact that they are spread over a comparatively long section it has been found impossible to accurately machine the pole tips and as a result the finished head assembly often contains individual heads having gaps of different width from the other heads in the assembly. Besides conforming to predetermined dimensions the gap of all heads in a multiple head assembly should be the same. Since the gap spacing of a magnetic recording head is perhaps the most important structural feature of the head, as far as its ultimate operation is concerned, this problem of improper and inaccurate gap spacing is extremely critical in any multiple head assembly. Further, although the individual heads in this type of construction can be closely spaced thus resulting in a comparatively short unit assembly, the cross-sectional dimensions of the finished assembly must be comparatively large in order to provide sufficient supporting material about the half sections to prevent physical shocks from cracking the half sections apart. In the use of this type of head construction it is also impossible to replace an individual head which has failed and it is therefore necessary to replace the entire group of heads due to the failure of one single head. Finally, recording surfaces such as rotating disks or drums often have local discontinuities and it is impossible for the individual heads of a unitary block of heads to follow such discontinuities. Thus, a small concave discontinuity will result in one or more of the heads being displaced from the recording surface in the immediate vicinity of the discontinuity and a small convex discontinuity will tend to raise all heads except those in the vicinity of the discontinuity away from the recording surface.

It is therefore an object of the present invention to provide an improved method of manufacturing magnetic recording and reproducing heads.

Another object of the present invention is to provide a simple and economic method of manufacturing magnetic recording and reproducing heads.

A further object of the present invention is to provide an improved method of manufacturing magnetic recording and reproducing heads wherein accurate control of the gap spacing is possible.

Still another object of the present invention is to provide an improved magnetic recording and reproducing head.

Another and further object of the present invention is to provide an improved magnetic recording and reproducing head which is comparatively small in size and highly resistant to physical shock.

A still further object of the present invention is to provide an improved magnetic recording and reproducing head which is particularly adapted for use in multi-channel apparatus.

Another object of the present invention is to provide an improved multi-channel recording and reproducing head assembly.

A further object of the present invention is to provide an improved multi-channel recording and reproducing head assembly which automatically adjusts to discontinuities in the recording surface.

A still further object of the present invention is to provide an improved multi-channel recording and reproducing head assembly wherein individual heads can be conveniently replaced in the event of failure.

Still another object of the present invention is to provide an improved mold for forming a magnetic recording and reproducing head.

Another object of the present invention is to provide an improved mold for forming a magnetic recording and reproducing head wherein the gap of said head may be accurately controlled.

Figure 2:
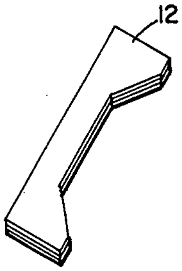
Figure 3:
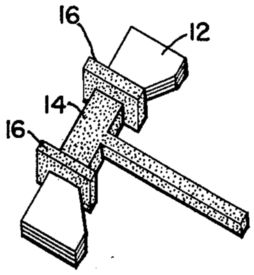
Figure 6:
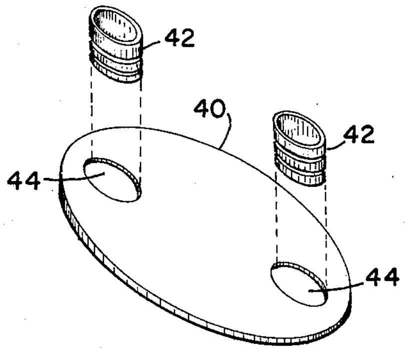
Figure 7:
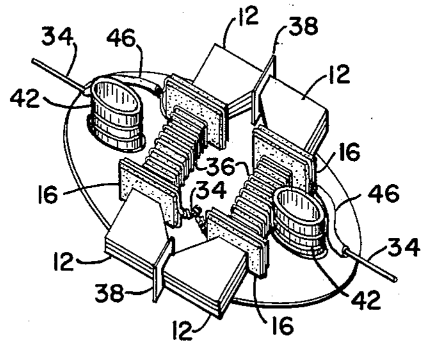
Figure 8:
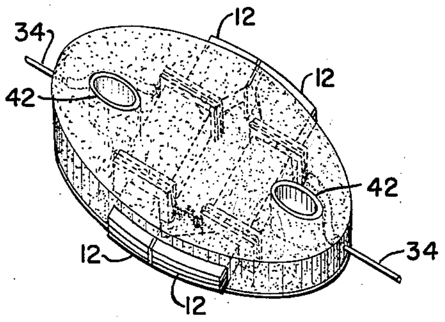
Figure 9:
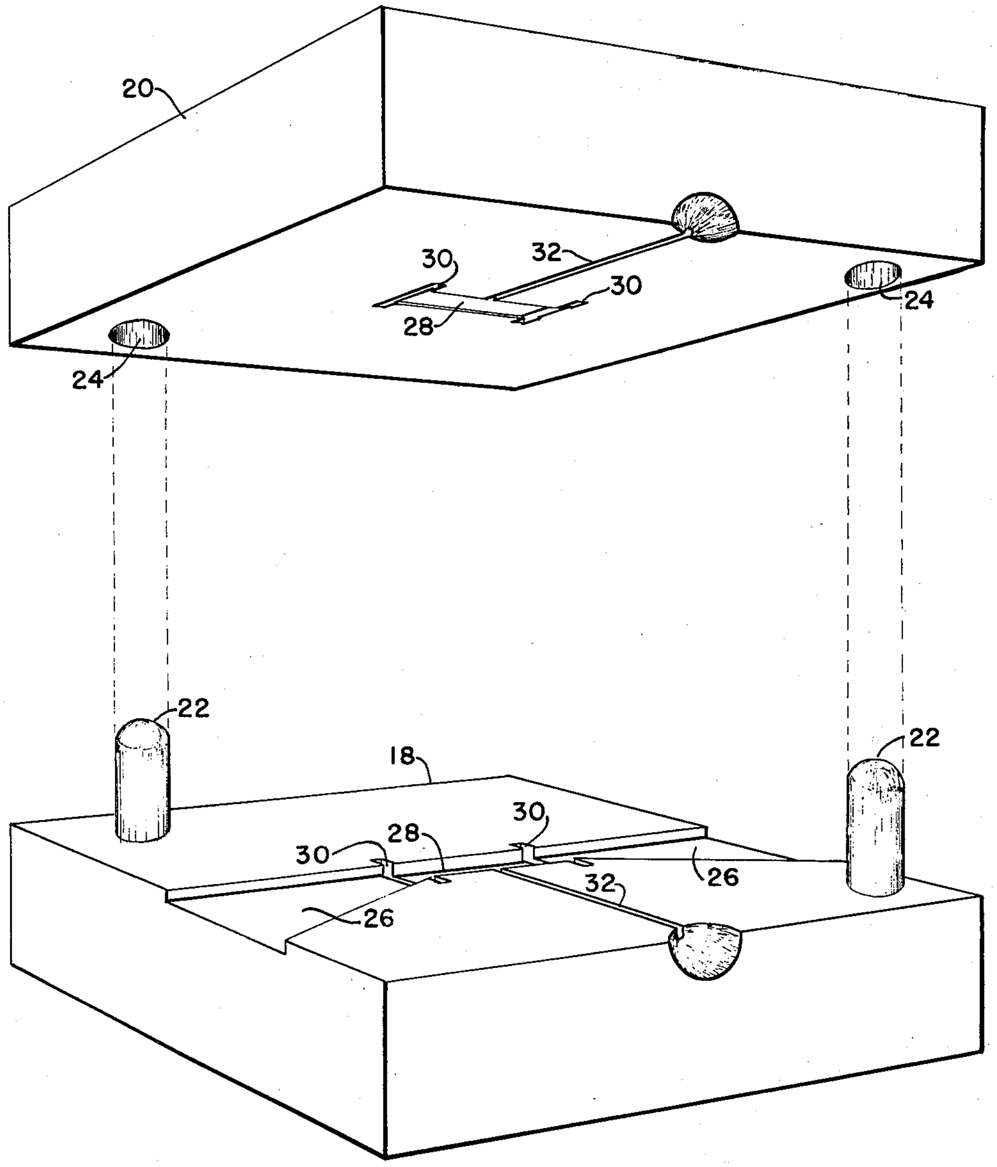
Figure 10:
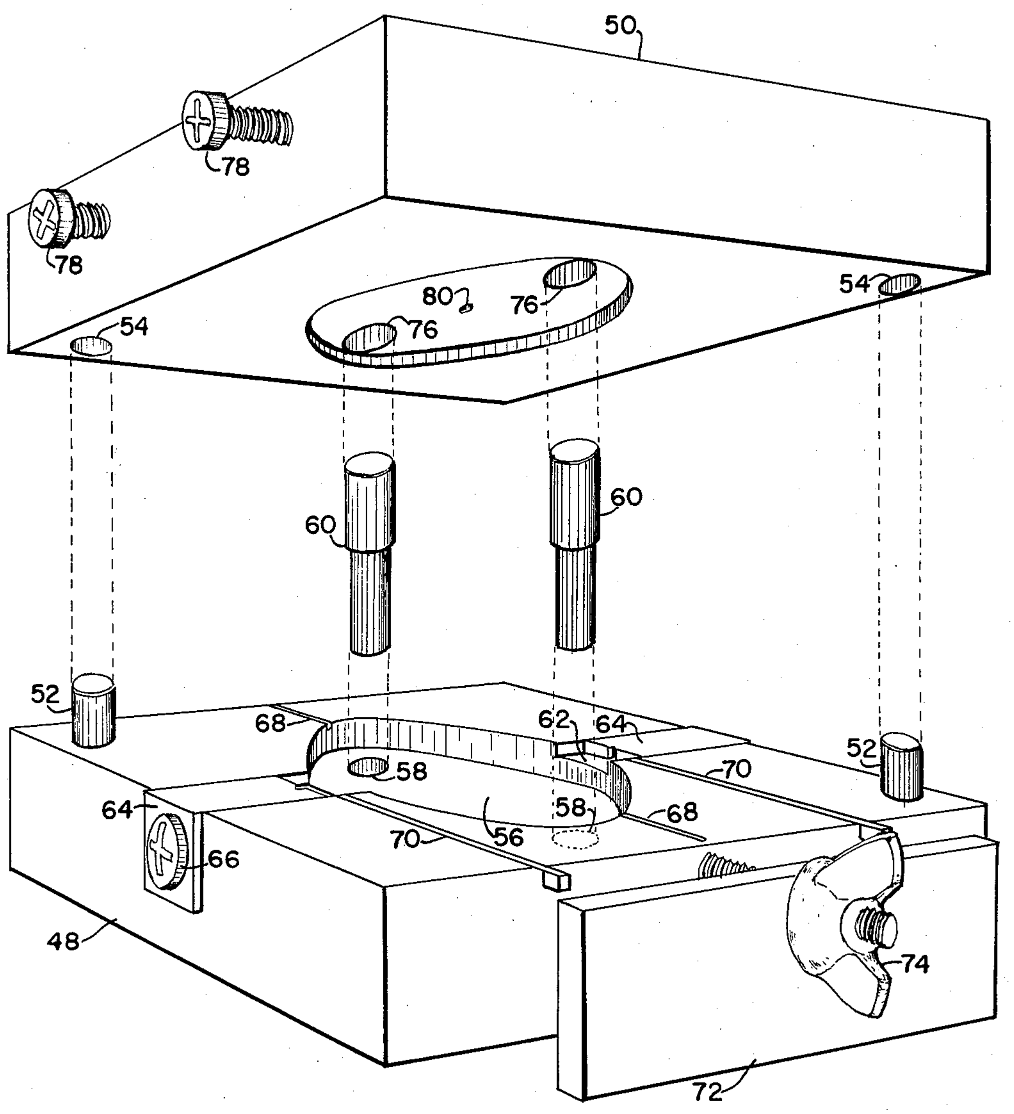
Figure 11:
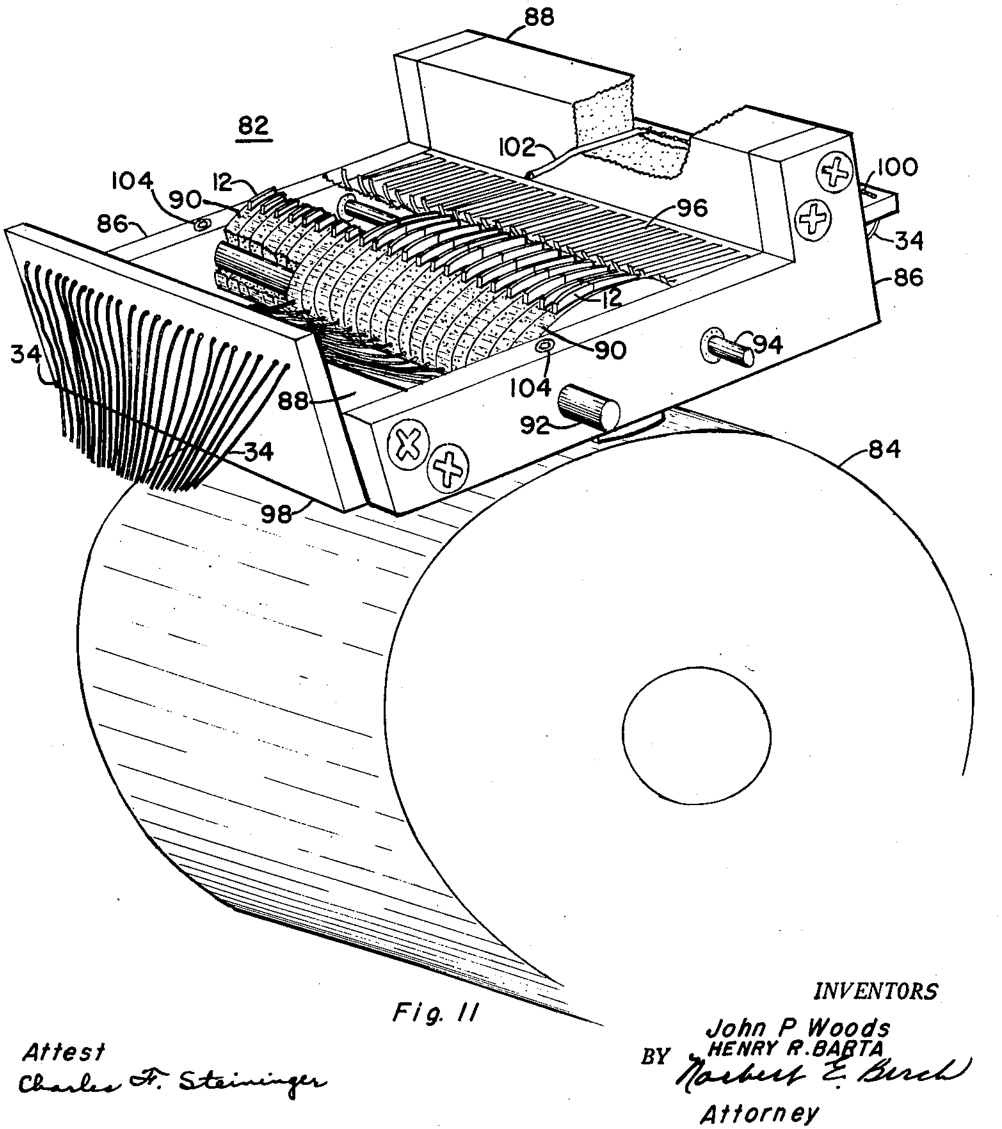

These and other objects and advantages of the present invention will be apparent from the following detailed description when read in conjunction with the accompanying drawings, wherein:

FIGURES 1 through 8, inclusive, illustrate the various component parts of the magnetic recording head of this invention and illustrate the steps in the manufacture of this recording head, FIGURE 9 represents a mold suitable for forming a winding base, as shown in FIGURE 3, one each pole piece, FIGURE 10 represents a mold suitable for use in forming the finished recording head shown in FIGURE 8, and FIGURE 11 illustrates a multi-channel recording head assembly incorporating recording heads of the instant invention.

Figure 4:
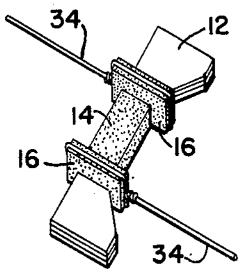
Figure 5:
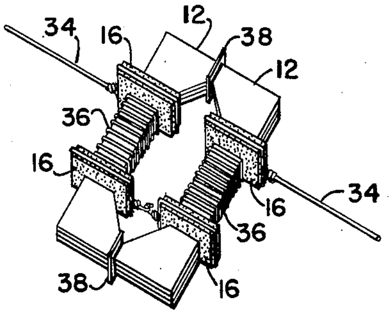

Referring now to FIGURES 1 through 10, inclusive, the numeral 10 designates a plurality of transformer steel laminations as shown in FIGURE 1. In addition to transformer steel, hydrogen annealed molybdenum permalloy, or other magnetic materials, may be employed. FIGURE 2 illustrates a pole piece 12 formed by cementing together a plurality of laminations 10. Generally, anywhere from two to eight or more laminations may be employed to produce the laminated pole piece, which in the instant case measures about 0.05 inch thick. FIGURE 3 shows a pole piece 12 having formed thereon a non-conductive winding base 14 having flanges 16 at either end thereof. Winding base 14 and flanges 16 are formed from a suitable non-conductive plastic or resinuous material, such as nylon, polystyrene, epoxide-type resins, or the like, which is capable of being pressure injection molded. In this instance, nylon has been found most suitable. It is to be observed that the complete winding base is formed in a single molding operation directly on the pole piece rather than in sections which must then be cemented on the pole piece. FIGURE 9 illustrates the mold employed to produce winding base 14 and flanges 16 on a pole piece. In accordance with FIGURE 9 the numeral 18 designates a base member of the mold while 20 represents a top member of the mold. The numeral 22 designates a pair of upstanding dowels fixedly attached to base member 18, which dowels cooperate with suitable holes 24 in top member 20. Obviously dowels 22 may be fixedly attached to top member 20 and be removable from base member 18 or be removable from both top member 20 and base member 18 since the function of the dowels is to align the top and bottom members. In forming the resinous winding base 14 and flanges 16 on pole piece 12, pole piece 12, whose longitudinal extremities cooperate with and rest in depressions 26 of base member 18, is placed in base member 18. When pole piece 12 is positioned in base member 18 it is to be observed that cooperating central depressions 28 of base member 18 and top member 20 are slightly larger than the dimensions of the central portion of pole piece 12. Thus a thin coating of resin will be formed about the central portion of pole piece 12 during the course of the molding operation to form winding base 14. Depressions 30 of base member 18 and top member 20 cooperate to form flanges 16 during the molding operation. With pole piece 12 in position on base 18 top member 20 is securely clamped to base member 18 by suitable clamp means (not shown) and molten resin, such as nylon, is injected through the aperture formed by channels 32 of base member 18 and top member 20. After winding base 14 and flanges 16 have been formed on pole piece 12 and the injection protrusion shown in FIGURE 3 has been removed suitable lead wires 34 are wound about flanges 16 as shown in FIGURE 4. In the next step of the operation suitable windings 36 are connected to lead wires 34 and wound about the winding base 14, for example, 600 turns of No. 43 wire. Two wound pole pieces are then placed in face to face relationship to one another, one pair of inner lead wires 34 are then connected together, and two thin, non-magnetic stainless steel spacers 38 are placed between the confronting tips of pole pieces 12 in order to provide a gap of uniform thickness between the pole pieces, all as shown in FIGURE 5. Spacers 38 are, of course, equal in thickness to the length of the gap desired, in this particular head being 0.0005 inch. Although only one of the gaps is used for recording or reproducing, the second gap provides magnetic symmetry in the structure and an increase in magnetic reluctance; in other words, the head is "humbucking" within certain limitations. Whenever the humbucking feature is not of major importance the second gap may be omitted by butt-joining one pair of confronting pole tips. In addition, although the windings are shown to be series connected and the present method of manufacture is most convenient for the production of a head having series connected windings the two windings may also be used either separately or in parallel. FIGURE 6 shows a shield 40 together with cooperating bushings 42 which fit within holes 44 of shield 40. Shield 40 is made of a suitable material of low magnetic permeability, such as mu-metal, and is employed to reduce crosstalk between the channels of a multi-channel unit. In the head being described shield 40 is 0.014 inch thick. Although it is most desirable to mold shields 40 into the head such shields may be merely placed between heads in assembling the multi-channel unit. FIGURE 7 shows the assembled pole pieces of FIGURE 5 in position on shield 40. Also, as shown in FIGURE 7, suitable insulation 46 may be placed around those portions of lead wires 34 which might come into contact with bushings 42.

In order to perform the second and last molding operation the component parts of the head are assembled, as illustrated in FIGURE 7, on the base member of the mold of FIGURE 10. The mold of FIGURE 10 is composed of a base member 48 and a top member 50. Upstanding dowels 52 are fixedly attached to base member 48 and cooperate with holes 54 of top member 50. The respective elements of the recording head are assembled in base member 48 of the mold as follows:

Shield 40 is placed in central depression 56 of base member 48. Bushings 42 are then positioned in holes 44 of shield 40. Inasmuch as the inner diameter of bushings 42 is equal to the diameter of holes 58 in central depression 56, bushings 42 will rest directly above holes 58. Pins 60, having a lower portion whose diameter is substantially equal to the inner diameter of bushings 42 and holes 58, are then placed in bushings 42 and holes 58. The upper ends of pins 60 are substantially equal in diameter to the outside diameter of bushings 42. The assembled pole pieces 12 are then placed in base member 48 with the longitudinal extremities of the pole pieces resting in depressions 62 of base member 48. The ends of lead wires 34 are placed in slots 68 of base member 48 and L-shaped aligning bars 64, slidably mounted in base member 48, are then clamped against the ends of pole pieces 12 by means of set screws 66 in order to position the pole pieces in the mold. Pressure bars 70, also slidably mounted in base member 48, are then forced against the back of one pole piece by means of pressure plate 72 and are clamped in this posiiton by means of wing nut 74. Pressure bar 70 thus provides an adjustment which will cause pole pieces 12 to be pressed firmly against spacers 38. Top member 50 is then placed in position on base member 48 with holes 76 of top member 50 cooperatively engaging the protruding upper ends of dowels 60. With top member 50 in position set screws 78 in top member 50 are then tightened to clamp against pins 60. Finally, the top and base members of the assembled mold are clamped together by means of suitable clamps (not shown) and a molten resin, such as nylon, is injected into the mold through aperture 80 in top member 50. After the resin has set the molded recording head is then removed from the mold and the protruding ends of pole pieces 12 are machined to form arcuate contact surfaces. A finished recording and reproducing head is shown in FIGURE 8. As has been pointed out above, nylon is the preferred molding material for the formation of the head of the present invention. It has been found that nylon shrinks slightly during setting and thus additional pressure is applied to clamp spacers 38 between pole pieces 12 and thus aid in the adjustment of the gap length. The body of the finished head specifically described herein nominally measures 1 inch across, 1.5 inches in length, and 0.145 inch in thickness and the pole pieces protrude 0.03 inch on either side of the body. Since the thickness of the finished head is less than 3 times the thickness of the pole pieces it is to be observed that 20 of these heads, assembled as a multichannel unit, would have a total length of only 2.9 inches, the total width of recording surface covered would be 2.805 inches and the "land" or distance between two tracks on the recording surface would be 0.095 inch. Obviously the recording heads of this invention may be made even smaller in thickness to further reduce the land width or the land width may be reduced by using two such multi-channel units whose tracks are interlaced.

FIGURE 11 shows a plurality of the magnetic recording heads of the instant invention assembled as a multichannel unit for use in conjunction with a magnetic drum, a magnetic disk or other suitable recording surface. In accordance with FIGURE 11 the recording head assembly, designated generally by the numeral 82, is shown in position on a recording drum 84. Recording head assembly 82 comprises a frame having side members 86 and end members 88, respectively. Positioned between side members 86 are a plurality of recording heads 90 with rotation bar 92 passing through side members 86 and through one each of bushings 42 of recording heads 90. Rotation bar 92 is substantially equal in diameter to the inner diameter of bushings 42 and permits recording heads 90 to rotate about bar 92. Bar 94 passes through the other bushing of recording heads 90 and side members 86. Bar 94 is, however, slightly smaller in diameter than the inner diameter of bushings 42 in order to limit within a predetermined range the rotation of the heads about bar 92. The limited degree of rotation about bar 92 thus permits each individual recording head to rest against drum 84 regardless of discontinuities in the recording surface of the drum. This self-adjustment of the individual recording heads may be brought about by the weight of the head itself or, if greater pressure is desired, a leaf-type spring 96 having individual spring elements resting against each recording head at its floating end may be provided. It is also obvious that suitable weights may be molded into the floating ends of the recording heads to provide added pressure in lieu of, or in addition to, the pressure applied by spring 96. One end of lead wires 34 of recording heads 90 may be passed to a suitable assembly board 98 attached to one end member 88 while the other end of leads 34 are passed to an assembly board 100 attached to the other end member 88. The ends of lead wires 34 which pass through assembly board 100 may be connected together and to a common lead wire 102. Common lead wire 102 and the individual lead wires 34 which pass through assembly board 98 may all be connected to a suitable multi-contact jack (not shown). Set screws 104 are vertically positioned in side members 86 and bear against rotation bar 92 to hold it in position in the frame. Similar set screws may be employed to hold bar 94 firmly in position in the frame. It is clear from an inspection of the recording head and the multi-channel assembly of the instant invention that individual recording heads which have failed in use may be conveniently replaced by merely removing bars 92 and 94, substituting a new head for the faulty head and then replacing bars 92 and 94.

It is to be observed that although specific embodiments of the instant invention have been illustrated and described herein, various modifications and substitutions may be made, which will be obvious to those skilled in the art, without departing from the scope of the present invention which is limited only by the appended claims.

We claim:

1. The method of manufacturing a thin magnetic recording and reproducing head comprising (a) pressure injection molding a thin non-conductive material about the mid portion of two generally C-shaped pole pieces to form a winding base on each of said pole pieces, (b) winding a predetermined number of turns of electrical conductive wire about said winding base to form a winding on each of said pole pieces, (c) assembling said wound pole pieces in face-to-face relationship to each other, locating the portions of said pole pieces carrying said windings in the depression of the base of a pressure injection mold adapted to form a unitary body around said wound pole pieces and inserting a thin, non-magnetic spacer between at least one pair of the confronting tips of said pole pieces, (d) applying non-yielding, temporary pressure against portions of the back of one of said pole pieces at points located beyond the limits of said depression and against said mold, said non-yielding, temporary pressure applied in such a manner that said spacer is forcibly clamped between said confronting tips, (e) pressure injection molding a non-conductive material about said assembled pole pieces to form said unitary body, said unitary body having at least one end of said assembled pole pieces which includes a portion of said confronting tips having said spacer therebetween protruding from the side thereof and at least one end of each of said windings protruding from the side thereof and a finished thickness less than about 3 times the thickness of said pole pieces, and (f) releasing said pressure from said pole pieces after said non-conductive material has set.

2. In a method as set forth in claim 1 wherein nylon is used in the pressure injection molding steps.

References Cited in the file of this patent

UNITED STATES PATENTS

| | | |
|---|---|---|
| 2,433,373 | Krim | Dec. 30, 1947 |
| 2,535,480 | Begun | Dec. 26, 1950 |
| 2,555,110 | Bobb | May 29, 1951 |
| 2,628,286 | Rettinger | Feb. 10, 1953 |
| 2,676,392 | Buhrendorf | Apr. 27, 1954 |
| 2,677,019 | Buhrendorf | Apr. 27, 1954 |
| 2,683,774 | Camras | July 13, 1954 |
| 2,693,508 | Lord | Nov. 2, 1954 |
| 2,698,966 | Scott | Jan. 11, 1955 |
| 2,724,862 | Merrill et al. | Nov. 29, 1955 |
| 2,745,905 | Bobb | May 15, 1956 |
| 2,751,440 | De Turk et al. | June 19, 1956 |
| 2,756,280 | Rettinger | July 24, 1956 |
| 2,769,036 | Selsted | Oct. 30, 1956 |
| 2,769,866 | Kornei | Nov. 6, 1956 |
| 2,805,472 | Botts et al. | Sept. 10, 1957 |
| 2,813,932 | Kornei | Nov. 19, 1957 |
| 2,831,214 | Eyles et al. | Apr. 22, 1958 |
| 2,954,586 | Wacker | Oct. 4, 1960 |

UNITED STATES PATENT OFFICE

CERTIFICATE OF CORRECTION

Patent No. 3,080,642 March 12, 1963

John P. Woods et al.

It is hereby certified that error appears in the above numbered patent requiring correction and that the said Letters Patent should read as corrected below.

In the grant, lines 1 to 3, for "John P. Woods and Henry Robert Barta, both of Dallas, Texas," read -- John P. Woods and Henry Robert Barta, both of Dallas, Texas, assignors to The Atlantic Refining Company, of Philadelphia, Pennsylvania, a corporation of Pennsylvania, --; line 12, for "John P. Woods and Henry Robert Barta, their heirs" read -- The Atlantic Refining Company, its successors --; in the heading to the printed specification, lines 4 and 5, for "John P. Woods and Henry Robert Barta, Both of 3629 Cragmont, Dallas, Tex.," read -- John P. Woods and Henry Robert Barta, both of Dallas, Tex., assignors to The Atlantic Refining Company, Philadelphia, Pa., a corporation of Pennsylvania --; column 3, line 48, for "one" read -- on --.

Signed and sealed this 22nd day of October 1963.

(SEAL)

Attest:

ERNEST W. SWIDER

Attesting Officer

EDWIN L. REYNOLDS

Acting Commissioner of Patents